(12) United States Patent
Weir et al.

(10) Patent No.: US 7,252,783 B2
(45) Date of Patent: Aug. 7, 2007

(54) TREATMENT OF SUSPENSIONS

(75) Inventors: Steven Weir, Huddersfield (GB);
Janine Marie Griffith, Liversedge (GB); Simon Paul Oldfield, Halifax (GB)

(73) Assignee: Ciba Specialty Chemicals Water Treatments LTD, Bradford (GB)

( * ) Notice: Subject to any disclaimer, the term of this patent is extended or adjusted under 35 U.S.C. 154(b) by 0 days.

(21) Appl. No.: 10/472,788

(22) PCT Filed: Apr. 2, 2002

(86) PCT No.: PCT/GB02/01242

§ 371 (c)(1),
(2), (4) Date: Sep. 24, 2003

(87) PCT Pub. No.: WO02/083258

PCT Pub. Date: Oct. 24, 2002

(65) Prior Publication Data

US 2004/0149630 A1 Aug. 5, 2004

(30) Foreign Application Priority Data

Apr. 11, 2001 (GB) ................................. 0109087.7

(51) Int. Cl.
*C02F 1/56* (2006.01)
(52) U.S. Cl. ...................... 252/180; 210/728; 516/129; 524/922
(58) Field of Classification Search ................ 210/728, 210/734; 252/180; 524/922
See application file for complete search history.

(56) References Cited

U.S. PATENT DOCUMENTS 3,367,918 A * 2/1968 Lesinski et al. ............ 525/154
3,509,021 A * 4/1970 Woodward .................. 162/167
3,994,806 A * 11/1976 Rausch et al. .............. 210/728

(Continued)

FOREIGN PATENT DOCUMENTS

EP 0183466 6/1986

(Continued)

OTHER PUBLICATIONS

Chem. Abstr. 1987:560906 for JP 62-53800 (1987).

(Continued)

*Primary Examiner*—Peter A. Hruskoci
(74) *Attorney, Agent, or Firm*—Shiela A. Loggins

(57) ABSTRACT

A method of dewatering a suspension of solids in an aqueous medium, comprising introducing into the suspension a flocculating system, which flocculation system comprises, a) a substantially non-ionic water-soluble polymer and b) a cationic polymeric flocculant of intrinsic viscosity at least 4 dl/g, thereby causing the solids to flocculate, separating the flocculated from aqueous medium, characterized in that i) the components a) and b) are introduced into the suspension as an aqueous blend; or ii) component a) is a non-ionic polymer that has an average molecular weight of below 750,000 and components a) and b) are introduced into the suspension as an aqueous blend or separately. Also claimed is an aqueous composition comprising the substantially non-ionic water-soluble polymer and cationic polymer, method for making it and a composition comprising a blend of substantially anhydrous particles of component (a) and component (b). The method and novel composition are particularly suitable for dewatering aqueous suspensions such as sewage sludges.

14 Claims, 7 Drawing Sheets

U.S. PATENT DOCUMENTS

| | | | | |
|---|---|---|---|---|
| 5,112,500 | A | * | 5/1992 | Jones .......................... 210/728 |
| 6,123,856 | A | * | 9/2000 | Kumpera et al. ............ 210/727 |
| 6,967,085 | B1 | * | 11/2005 | Hughes et al. ................. 435/29 |
| 6,979,405 | B2 | * | 12/2005 | Weir ........................... 210/727 |

FOREIGN PATENT DOCUMENTS

| | | |
|---|---|---|
| EP | 0262945 | 4/1988 |
| EP | 0522334 | 1/1993 |
| EP | 0940449 | 9/1999 |
| GB | 1146384 | 3/1969 |
| GB | 1391578 | 4/1975 |
| GB | 2189792 | 11/1987 |
| WO | 95/33697 | 12/1995 |
| WO | 99/50195 | 10/1999 |

OTHER PUBLICATIONS

Lee C.H. and J.C. Liu (2000) "Enhanced sludge dewatering by dual polyelectrolytes conditioning" *Water Residues 34* pp. 4430-4436.

* cited by examiner

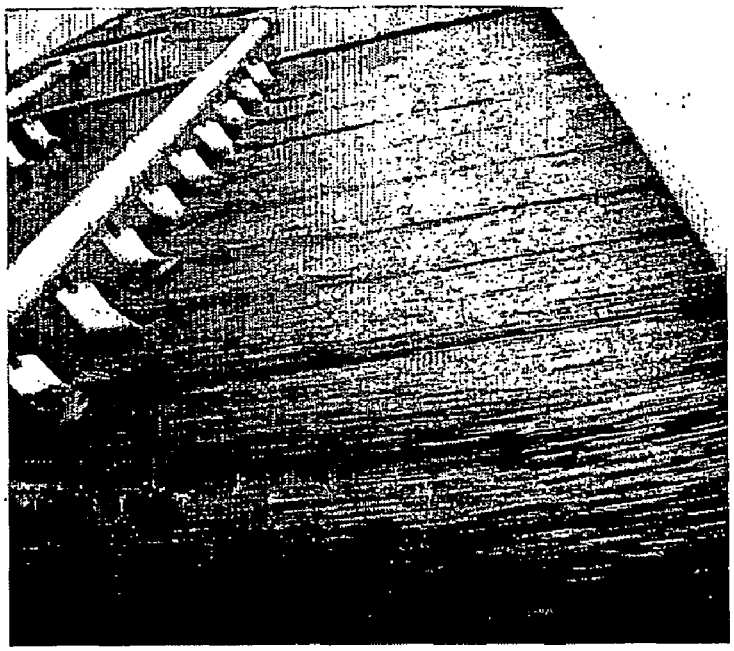
Fig 3 - Cationic alone at optimal dose pump setting 3.5
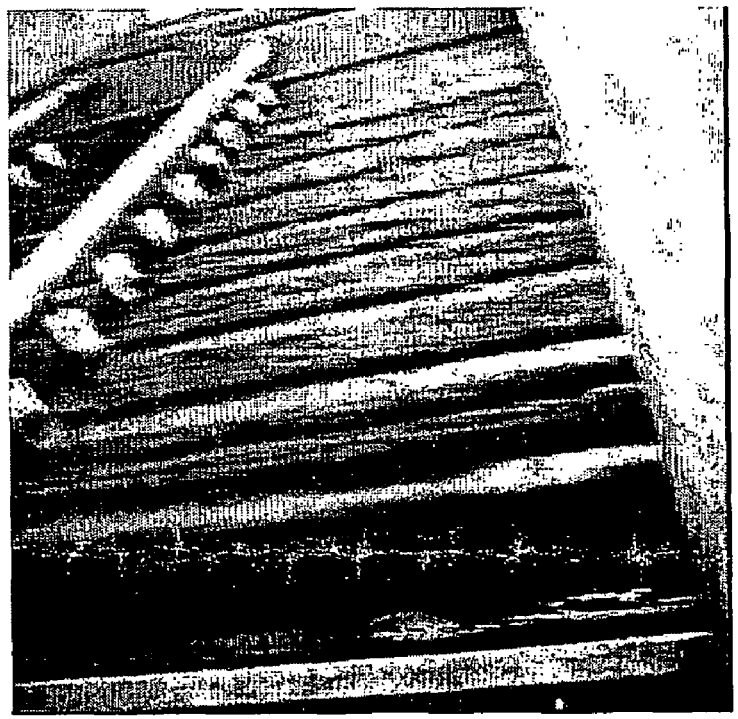
Fig 4 - Cationic/Nonionic (Invention) at optimal pump setting 5

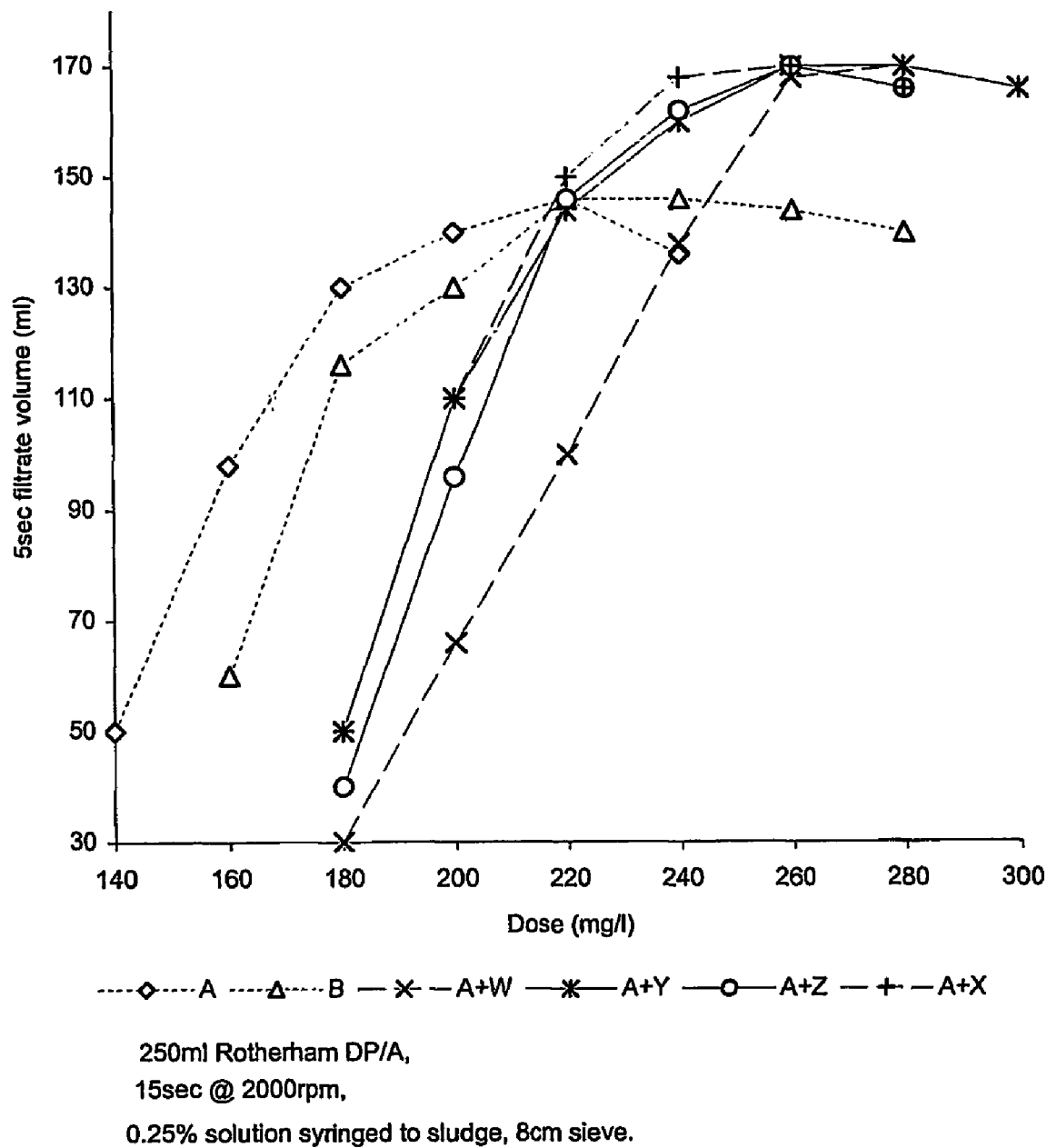

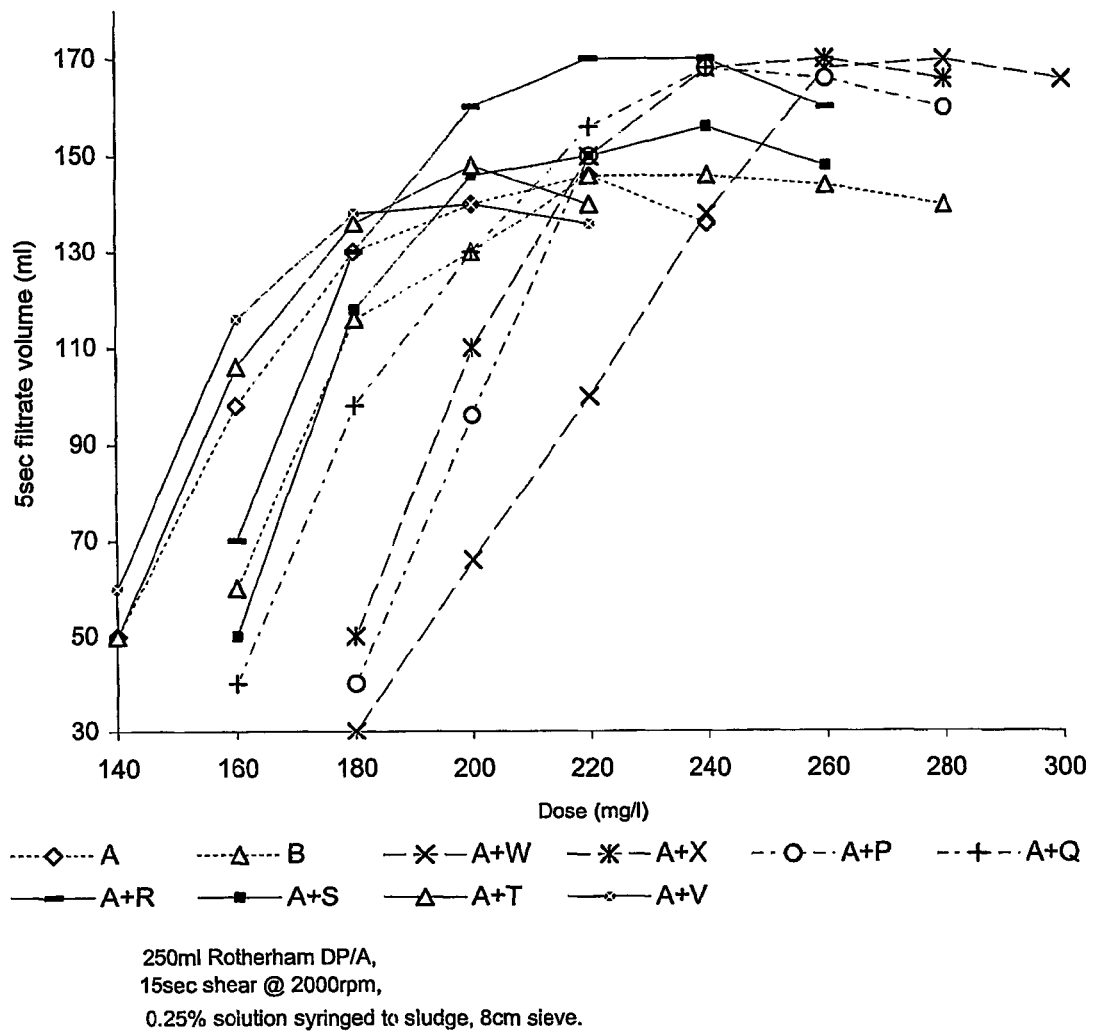

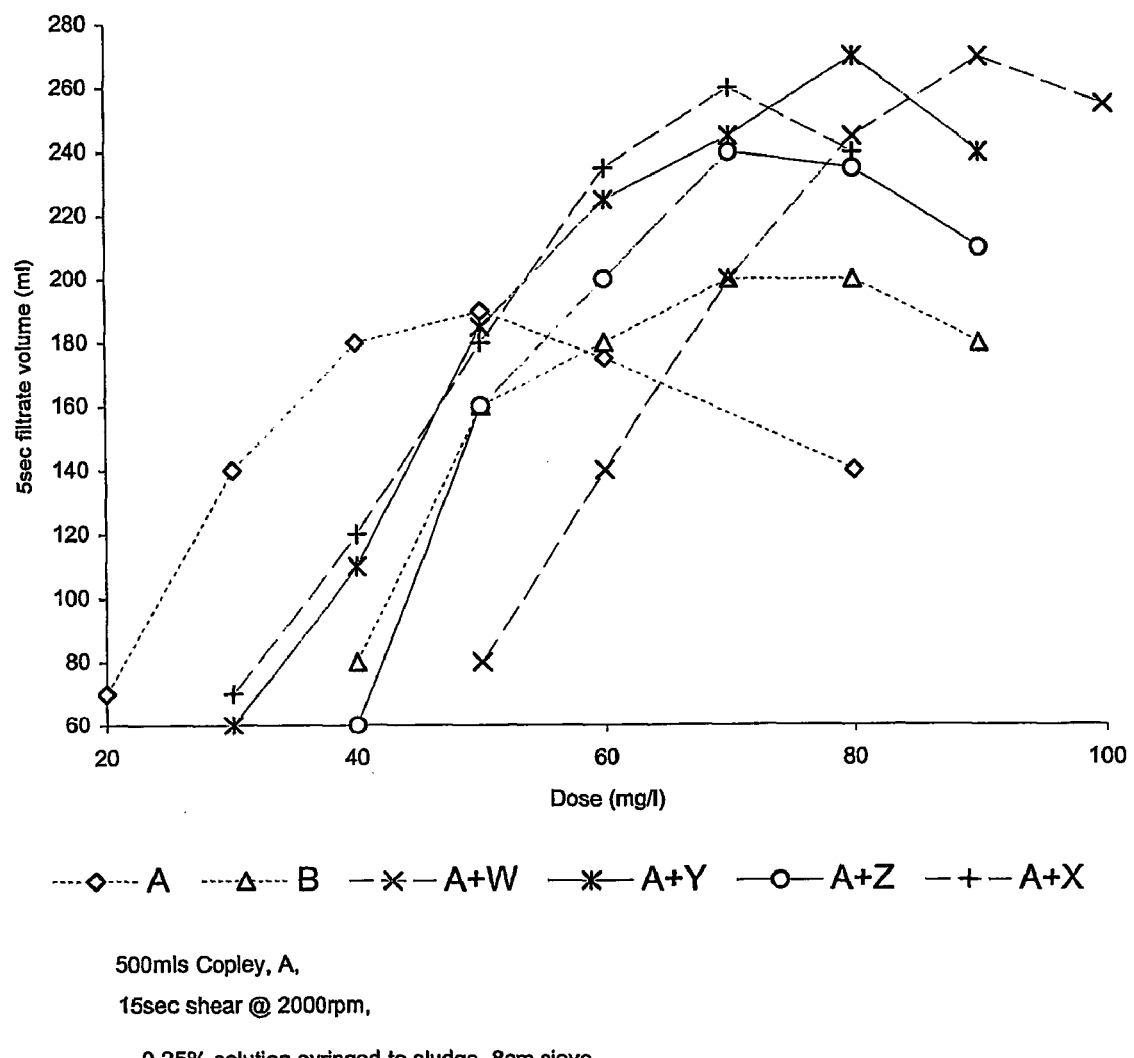

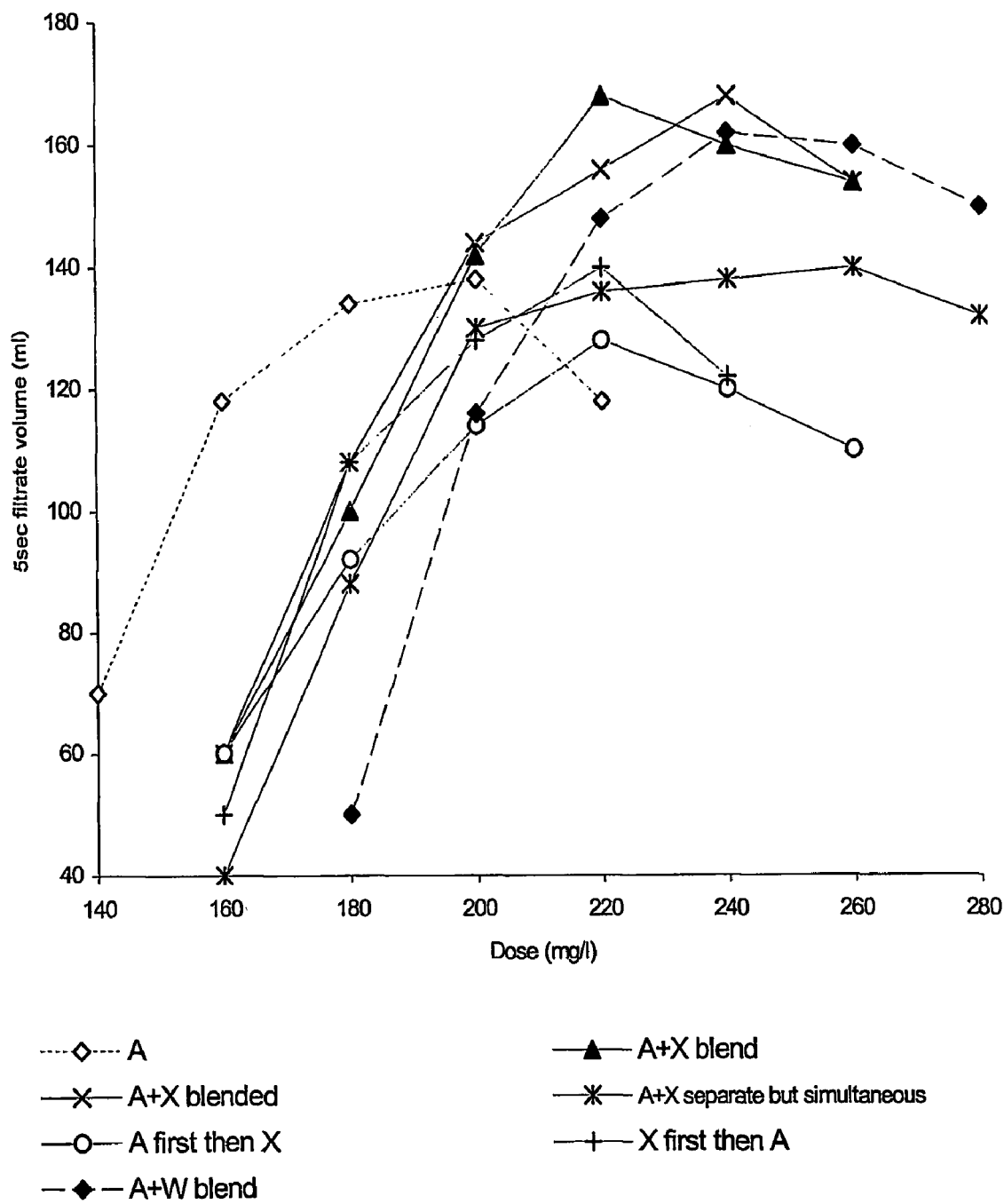

TREATMENT OF SUSPENSIONS

This invention relates to processes of flocculating aqueous suspensions of solids. In particular the invention provides a process for the treatment of sewage sludge in order to effect separation of solids suspended in the sludge.

It is well known to apply polymeric flocculants to aqueous suspensions in order to separate solids from the suspension. For instance it is common practice to flocculate and then dewater suspensions containing suspended solid organic material solids. For instance it is common practice to flocculate sewage sludge in order to effect dewatering.

High molecular weight polymeric flocculants are commonly used for this purpose. High molecular weight flocculants may be cationic, anionic, non-ionic or amphoteric in nature. The choice of polymeric flocculant will largely depend upon the substrate, which is being treated. For instance it is common practice to use high molecular weight cationic flocculants to treat aqueous suspensions comprising suspended organic material, for instance sewage sludge. Generally however for a sewage sludge high molecular weight cationic polymers have been found to be most effective.

It is also known to use two different polymeric flocculants in the same process. The flocculants may have the same charge (co-ionic). For instance in commercial practice in the dewatering sewage sludge these may be co-ionic. In other processes it is known to apply two polymers of opposite charge (counter-ionic). Where two polymeric flocculants are applied to an aqueous suspension they may be added to the substrate simultaneously or more usually sequentially.

Non-ionic polymers have been used in various other flocculation applications. For instance in U.S. Pat. No. 4,690,752 a process for separating and recovering non-metallic minerals, particularly phosphate, in which the ore is slurried in an alkaline, aqueous solution with dispersing agent. A flotation collector is added, and the mixture is contacted with a hydrophobic, high molecular weight non-ionic flocculant to flocculate the fine particles and then make them amenable to subsequent flotation. This patent also proposes separately a second process for recovering a phosphorus ore upgraded by at least about 5% phosphate content from phosphate slime by use of a high molecular weight anionic polyacrylamide GB-A-1579007 describes the use of cationic flocculants based on copolymers of methyl chloride quaternised dimethylaminoethyl acrylate and acrylamide, in which optimum performance is said to occur when the polymers have a cationicity value of at least 90% of the theoretical cationicity value.

WO-A-9533697 describes a flocculation process which employs dosing the suspension with a coagulant and then a high molecular weight flocculant. The flocculant is added at a predetermined value and the dose of coagulant is varied in response to the monitored charge or other value of the suspension. Such monitoring can be a streaming current detector. The flocculant is a polymer of intrinsic viscosity at least 4 dl/g (i.e. molecular weight of several million) and can be cationic, noionic or anionic. The coagulant can be a relatively low molecular weight polymer and must be ionic, either cationic or anionic. The coagulant polymer may contain non-ionic monomer in an amount of up to 30% by weight.

Linear, high molecular weight flocculant polymers are used by forming, with ageing, a true aqueous solution of the polymer and dosing this with minimum agitation into the suspension, followed by dewatering of the suspension. Optimum results require accurate dosing and minimum of agitation during flocculation. If this dose is too low or too high flocculation is inferior. The optimum dose depends upon the content of the suspension and so variations in it, for instance variations in the metal content of industrial sewage effluent, can greatly affect performance. The flocs are very sensitive to shear such that agitation, especially if the dosage is not at an optimum, is likely to redisperse the solids as discrete solids. This is a particular problem when the flocculated solids are to be dewatered under shear, for instance on a centrifuge, because if dosage and other conditions are not optimum the centrate is likely to have discrete solids.

EP-A-204404 describes the use of cationic and nonionic polymers to improve drainage and retention during paper making processes. The nonionic polymer is preferably a polyacrylamide, which generally has an average molecular weight of at least 1 million for instance up to 25 million. The cationic polymers of molecular weight up to 5 million are mentioned but preference is given to much lower molecular weight polymers, for instance low molecular weight cationic homopolymers of molecular weight of less than 1 million, which would normally be regarded as coagulants.

GB-A-1391578 is concerned with a method of clarifying water containing suspended solids comprising adding to the water, from 0.1 to 20 ppm of a premixed aqueous solution of water soluble cationic and non-ionic polymers. The polymers must contain high levels of cationic polymer relative to the cationic polymer and these are defined as being from 5:1 to 20:1 cationic to non-ionic. The cationic polymers are said to be as low as 1,000 or higher than 1,000,000 and that the higher molecular weight polymers are preferred. The cationic polymers exemplified are either polyethylenimines or polyDADMACs and so inevitably such polymers are not likely to have molecular weights in excess of 1 or 2 million. The process is related to the clarification of water and does not address the particular problem of treating sludges or other high solids suspensions.

An article by CH Lee et al Water Research Volume 34 No 18 pages 4430 to 4436, 2000 discusses dual polyelectrolyte systems employing cationic and non-ionic polymers for sludge dewatering. The studies discussed in this report compared single treatments using either cationic polymer or non-ionic polymer with dual sequential treatments using a cationic polymer of 4 million and a high molecular weight non-ionic polymer of molecular weight 13 million. The authors concluded that better dewaterability of the sludge resulted when cationic polymer was applied before non-ionic polymer. Nevertheless the test-work does not compare treatments using the more effective higher molecular weight cationic polymers of intrinsic viscosity of at least 4 dl/g, more particularly polymers of intrinsic viscosity of at least 8 dl/g, which would in any event be expected to have been more effective as a single treatment than single treatments of either low molecular weight cationic polymer or high molecular weight non-ionic polymer.

EP-A-202780 describes a process for flocculating an aqueous suspension of suspended solids, for instance a sewage sludge by introducing into the suspension water swellable, water insoluble polymeric particles having a specific viscosity above 10 and wherein the polymeric particles have a size below 10 microns. The process shows improved rate of flocculation and therefore solids liquid separation in comparison with convention flocculants. Thus in dewatering sewage sludge remarkably high filtration rates can be achieved. This process also does not suffer from the problems of dose sensitivity and exhibit optimum flocculation over a broader dose range than traditional linear flocculants. Nevertheless this process requires that the insoluble polymer particles have an average particle size below 10 microns. Although such polymer particles can easily be made, for instance by reverse phase emulsion polymerisation, there is a need to provide an alternative flocculation system which exhibits increased effectiveness and reduced dose sensitivity, which does not necessarily require preparing cross-linked polymer particles at a particle size below 10 microns.

However, despite the prior art processes, there still exists a need to provide an improved process for the flocculation of suspensions. In particular there is a need to provide an improved process for the flocculation of high solids suspensions such as a sludge and especially to provide faster dewatering and/or higher cake solids. It is also an objective to provide a process that provides improved flocculation by comparison to standard linear cationic flocculants, using linear products. It is a further objective to achieve this objective using polymeric products that can easily be prepared in the form of solid grade particulate products or as aqueous solutions.

According to the present invention we provide a method of dewatering a suspension of solids in an aqueous medium, comprising introducing into the suspension a flocculating system, which flocculation system comprises, a) a substantially non-ionic water-soluble polymer and
b) a cationic polymeric flocculant of intrinsic viscosity at least 4 dl/g, thereby causing the solids to flocculate, separating the flocculated from the aqueous medium, characterised in that i) the components a) and b) are introduced into the suspension as an aqueous blend; or
ii) component a) is a non-ionic polymer that has an average molecular weight of below 750,000 and components a) and b) are introduced into the suspension as an aqueous blend or separately.

A further aspect of the invention relates to a novel composition comprising the aqueous blend of components a) and b).

The cationic polymer should be of sufficiently high molecular weight such that it exhibits an intrinsic viscosity of at least 4 dl/g. Such an intrinsic viscosity generally indicates a polymer of several million molecular weight, for instance generally greater than 5,000,000 and usually at least 7,000,000. In general the cationic polymer preferably has an intrinsic viscosity greater than 6 dl/g, often at least 8 or 9 dl/g. The intrinsic viscosity can be as high as 30 dl/g or higher. In many cases though suitable cationic polymers exhibit an intrinsic viscosity in the range of 7 to 25 dl/g, in particular 10 to 20 dl/g, in particular round 14 or 15 dl/g.

The cationic polymer may be any natural or synthetic polymer, but it is preferably synthetic and may be formed by polymerisation of at least one cationic monomer alone or with other water-soluble monomers. By water-soluble we mean that the monomer has a solubility of at least 5 g/100 ml at 25° C. Suitable cationic monomers include quaternary ammonium or acid salts of monomers that contain amine groups. Preferably the cationic polymer is formed from a monomer or blend of monomers comprising at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride. The cationic monomers may be hompolymerised or copolymerised with other monomers, for instance acrylamide. The cationic polymers thus may be any polymer that carries a cationic, provided of course that they are of sufficiently high molecular weight to exhibit an intrinsic viscosity of at least 4 dl/g.

Intrinsic viscosity is measured using a suspended level viscometer in 1M NaCl buffered to pH 7.5 at 25° C.

The cationic polymers according to the invention may be prepared as substantially linear polymers or as branched or structured polymers. Structured or branched polymers are usually prepared by inclusion of polyethylenically unsaturated monomers, such as methylene-bis-acrylamide into the monomer mix, for instance as given in EP-B-202780. Preferably however, the polymers are substantially linear and are prepared in the form of a bead or powdered product.

A particularly preferred group of cationic polymers includes copolymers of acrylamide with at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride, having an intrinsic viscosity of at least 4 dl/g. The cationic acrylamide polymers may comprise 10 to 90% by weight acrylamide and 10 to 90% by weight cationic monomer(s).

When the components a) and b) are added to the suspension as an aqueous blend the substantially non-ionic polymer may be any synthetic or natural polymer, including but not limited to polysaccharides, vinyl addition polymers and other synthetic polymers such as polyalkylene oxides. Preferably the polymers are synthetic and more preferably the polymers are formed from one or more monoethylenically unsaturated water soluble monomers. The polymers desirably have a molecular weight of up to 20,000,000.

In one preferred form it is a low molecular weight polymer wherein the non-ionic polymer has an average molecular weight of below 750,000, preferably up to 500,000. In another form the polymer exhibits an intrinsic viscosity of at least 4 dl/g or higher.

We have found especially beneficial results are obtained from a blend of the cationic and non-ionic polymers, in which the two polymers are interacted to form a new species, which is present as small dispersed particles of average particle size less than 10 microns. We have shown through electromicrograph studies that the particles usually have an average particle size in the range 2 to 10 microns.

The composition can be prepared by combining the two polymers in any suitable way. The composition can desirably be prepared by mixing together an aqueous solution of the substantially non-ionic polymer and an aqueous solution of the cationic polymer. Alternatively particles of the cationic polymer and particles of the non-ionic polymer can be admixed with water and then the particles of each polymer can dissolve to form the aqueous composition. The particles may be dispersed in a carrier liquid, such as a water immiscible liquid including but not limited to an organic liquid. Thus the particles may be in the form of a reverse emulsion or reverse phase dispersions of each polymer which are inverted into water such that the polymers dissolve to form the aqueous composition. It is preferred however, for the non-ionic and cationic polymers to be added to water in the form of a blend of substantially anhydrous polymer particles. Preferably the blend of polymer particles comprises polymer particles having an average particle size of at least 50 microns, more preferably having an average particle size of 300 microns to as large as 1 or 2 mm. The substantially dry blend of polymer particles may contain diluents which can assist dissolution, but usually consists essentially of particles of non-ionic polymer and particles of cationic polymer. In this form it is particularly preferred for the non-ionic polymer to exhibit an intrinsic viscosity of at least 4 dl/g.

In one aspect of the present invention the non-ionic polymer has an average molecular weight of below 750,000 and components a) and b) are introduced into the suspension either as an aqueous blend or separately, for instance sequentially or substantially simultaneously. Thus when the polymer is added to the suspension separately the non-ionic polymer must be of low molecular weight, that is has a molecular weight of below 750,000. In this form of the invention desirable results are obtained though when the molecular weight is significantly less than 750,000, for instance up to 500,000. More advantageously in this form of the invention the non-ionic polymer should have a molecular weight up to 400,000, for instance in the range 20,000 to 400,000. We have found that best results are achieved using non-ionic polymers in the range 40,000 to 150,000, especially around 80,000. We have surprisingly found that the when this non-ionic polymer is added separately from the cationic polymer that surprisingly good dewatering of the suspension is achieved. By contrast we have found that there is no synergism when cationic polymer and high molecular weight non-ionic polymers, for instance of molecular weight in excess of 1 million, are added to the suspension separately.

When the components a) and b) are added to the suspension in the form of an aqueous blend the non-ionic polymer may be of any molecular weight and thus either with low or high molecular weight polymers there appears to be a synergism with the cationic polymer. Thus the aqueous blend of cationic polymer of IV at least 4 dl/g with non-ionic polymer surprisingly achieves greatly improved rate of solids/liquid separation. In one preferred form of the invention the aqueous blend comprises the blend of cationic polymer with low molecular weight non-ionic polymer of molecular weight below 750,000. In another preferred form the aqueous blend comprises a non-ionic polymer of intrinsic viscosity of at least 4 dl/g. Typically such a polymer will have a molecular weight of several million, for instance at least 4 or 5 million. In this form the non-ionic polymer may exhibit an intrinsic viscosity of at least 8 or 9 dl/g, for instance as high as 10 or 12 dl/g or higher.

Either as an aqueous blend or when added as a low molecular weight polymer separately, the substantially non-ionic polymer may be slightly ionic. Generally the substantially non-ionic polymer will comprise, for instance no more than 10 mole % ionic repeating units. Thus the polymer may contain up to 10 mole % anionic groups or up to 10 mole % cationic groups. It may also be desirable for the substantially non-ionic polymer to comprise both anionic and cationic groups provided that the effective ionic charge is less than 10 mole %. However, it is preferred that when the non-ionic polymer contains ionic groups that it is substantially only one or the other anionic or cationic groups. When the substantially non-ionic polymer does comprise ionic groups, it may be as a result of copolymerising a non-ionic monomer with low amounts of ionic monomer, for instance up to 10 mole %. Alternatively the polymer may prepared using a non-ionic monomer that is capable of being converted into an ionic monomer. In this instance a non-ionic monomer may polymerised and either during the polymerisation process or subsequently up to 10 mole % of the non-ionic monomer units would be converted into ionic groups. For instance the nonionic monomer may be acrylamide up to 10 mole % of the acrylamide repeating units may be hydrolysed to acrylic acid units.

Although the substantially non-ionic polymer can be slightly ionic it is preferred that the ionic content is below 5%. More preferably the polymer is wholly non-ionic or contains no more than 2 mole % anionic repeating units.

The non-ionic polymer is desirably prepared from non-ionic water soluble ethylenically unsaturated monomers. Such polymers may be prepared by any of the standard industrial processes for making polymers, for instance by solution polymerisation, reverse phase suspension polymerisation or reverse phase emulsion polymerisation. The non-ionic polymer thus may be provided in the form of beads, powder or emulsions. Typically the non-ionic polymer is selected from the group consisting of polymers of acrylamide, polyvinyl pyrrolidone and polyethylene oxide. Preferably the nonionic polymer is a homopolymer of acrylamide.

The flocculating system according to the invention employs any suitable ratio of the said cationic polymer and the said nonionic polymer. Typically the weight ratio of cationic polymer to substantially nonionic polymer is 10:90 to 90:10. Preferred results are obtained when the ratio is 10:90 to 75:25, more preferably 25:75 to 75:25. Better results are generally obtained when the amounts of nonionic and cationic polymers are approximately the same (60:40 to 40:60). Thus the most preferred ratio is about 50:50.

The invention is suited to a variety of processes involving flocculation and dewatering. Processes of particular relevance include dewatering sewage sludges, dewatering mineral suspensions, dewatering of paper mill sludges, dewatering of deinked cellulosic sludges e.g. from paper deinking plants and also papermaking processes. The method is particularly suited to dewatering sewage sludge.

Thus when the non-ionic polymer is a low molecular weight polymer as defined herein, the flocculating system of the present invention may be used by introducing the cationic and non-ionic polymers separately. The cationic polymer and nonionic polymers will normally be metered into the suspension as aqueous solutions. Thus the two polymer solutions may be metered directly into the suspension as separate solutions either sequentially or substantially simultaneously. By substantially simultaneously we mean that the two solutions may be added at approximately the same dosing point. Where the cationic and non-ionic polymer solutions are added to the suspension separately, they may be added in either order. For instance if the cationic polymer solution is added first the non-ionic polymer solution may be added after flocculation has commenced but should be added before the dewatering stage and before any high shear stage, such as pumping or screening stages. Alternatively, it may be desirable to add the cationic polymer solution after the addition of the non-ionic polymer solution. When the cationic and non-ionic polymer solutions are added separately it may be appropriate to allow or apply some degree of mixing between the dosing stages in order to allow the first polymer dose to become distributed throughout the suspension solids. This mixing may for instance include allowing the treated suspension to pass some distance along a flow line which optionally contains bends, baffles, constrictions or other features which induce gentle mixing.

Preferably when added separately, the cationic and non-ionic polymer solutions are introduced sequentially.

Most preferably the cationic and non-ionic polymer solutions are introduced into the suspension as an aqueous composition comprising the said non-ionic polymer solution and the said cationic polymer solution. The non-ionic polymer and cationic polymer may exist as discrete components. Preferably however, the two polymers interact to form a composition in which the non-ionic and cationic polymers are intimately distributed throughout the composition. In some cases the non-ionic and cationic polymer will at least partially react to form a new species.

We have found that the method allows significant improvements in flocculation and filtration rate over convention treatments, especially for the treatment of sewage sludge. The present method also provides a wider range of optimum dose. Thus the method allows more effective dewatering to occur with the reduced risk of overdosing.

BRIEF DESCRIPTION OF THE DRAWINGS

FIGS. 1, 2, and 5-8 show graphs of test results from the instant Examples.

FIGS. 3 and 4 show photographs of comparative treatments in the Examples.

The following examples illustrate the invention.

EXAMPLE 1

Test Run 1

Figure 1:
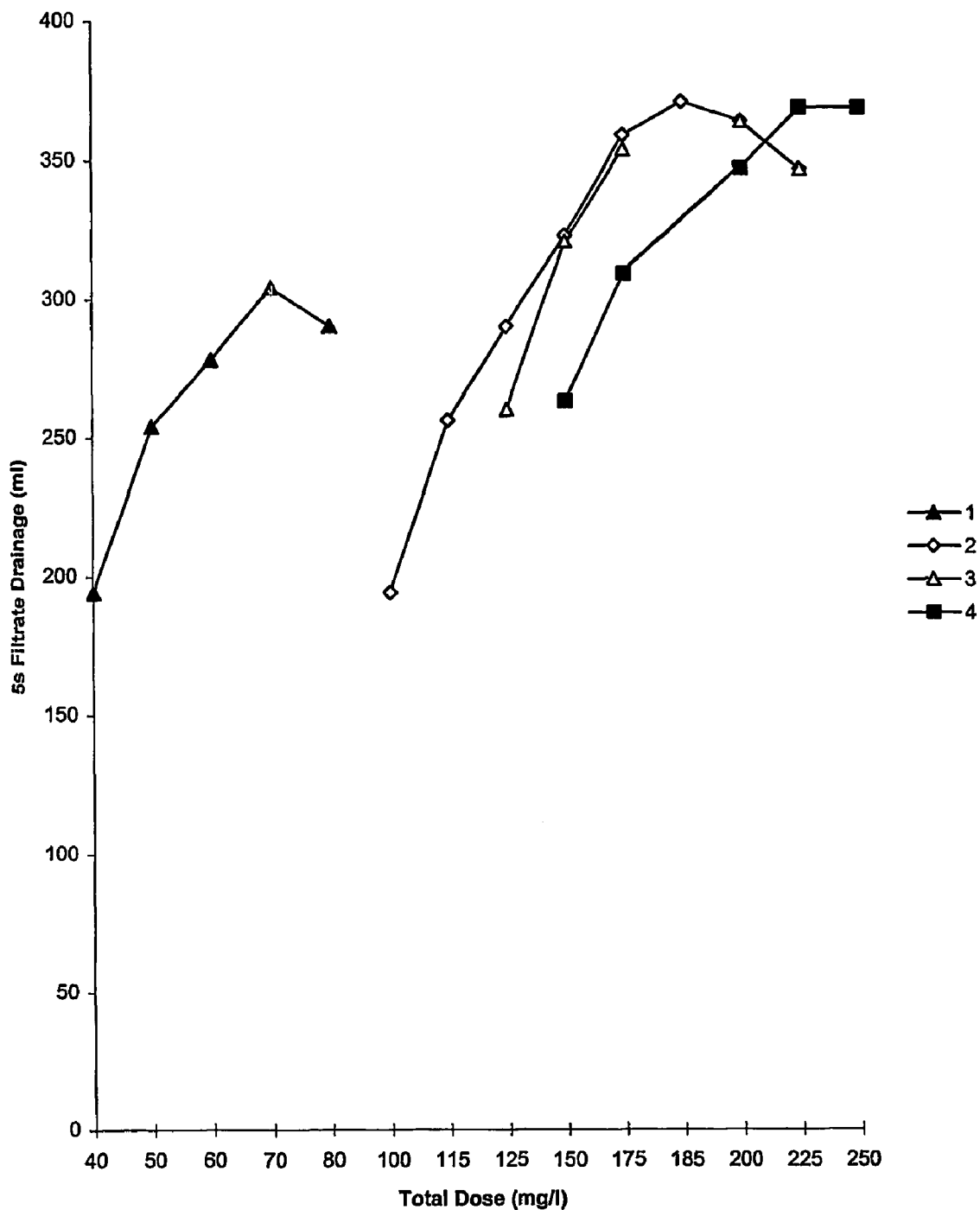

0.25% aqueous solution of a cationic copolymer of acrylamide with dimethylaminoethyl acrylate, methyl chloride quaternary ammonium (40/60 weight/weight), intrinsic viscosity of 9.9 dl/g was applied at various doses of 500 ml samples of Rotherham (Yorkshire, England) DP/A sewage sludge that has diluted with water in a ratio of 2:3. The treated sludge was mixed at 1,000 rpm for 15 seconds. The flocculated sludge is free-drained through a 8.0 cm diameter sieve fitted with a cloth from a belt press. The amount of filtrate drained in 5 seconds (corrected for dose of flocculant) was recorded. The results are shown in Table 1 and plotted in FIG. 1.

Test Run 2

Test run 1 was repeated except that after the addition of the cationic polymer the treated sludge was mixed at 1,000 rpm for 5 seconds and then a 0.25% aqueous solution of an acrylamide homopolymer of molecular weight 80,100, followed by 15 seconds of mixing at 1,000 rpm. The ratio of cationic to non-ionic is 50:50 by weight. The results for each total polymer dose are shown in Table 1 and plotted in FIG. 1.

Test Run 3

Test run 2 was repeated except that the order of addition of the cationic and non-ionic is reversed. The results for each total polymer dose is shown in Table 1 and plotted in FIG. 1.

Test Run 4

Test run 1 was repeated except that instead of using a single addition of cationic polymer, a 50/50 weight/weight blend of the cationic polymer and non-ionic polymer (as referred to in test runs 1 to 3) was prepared by mixing 0.25% aqueous solutions of the two polymers, followed by vigorous shaking by hand. The blended polymer was added to the sludge in the manner described for test run 1. The results for each total polymer dose is shown in Table 1 and plotted in FIG. 1. results for each total polymer dose.

TABLE 1

| Test Run | Dose of polymer (mg/l) | | | | | | | | | | | | | |
|---|---|---|---|---|---|---|---|---|---|---|---|---|---|---|
| | 40 | 50 | 60 | 70 | 80 | 100 | 115 | 125 | 150 | 175 | 185 | 200 | 225 | 250 |
| 1 | 194 | 254 | 278 | 304 | 290 | — | — | — | — | — | — | — | — | — |
| 2 | — | — | — | — | — | 194 | 256 | 290 | 323 | 359 | 371 | 364 | 347 | — |
| 3 | — | — | — | — | — | — | — | 260 | 321 | 354 | — | 364 | 347 | |
| 4 | — | — | — | — | — | — | — | — | 263 | 309 | — | 347 | 369 | 369 |

Results—ml of filtrate drained in 5 seconds

EXAMPLE 2

The flocculation system of the present invention was evaluated at various doses on an activated sludge on a belt thickener at a sewage treatment plant.

The flocculation system of the present invention comprised an aqueous composition formed by mixing 40 parts by weight of a 0.25% aqueous solution of a cationic copolymer of acrylamide with dimethylaminoethyl acrylate, methyl chloride quaternary ammonium (40/60 weight/weight), intrinsic viscosity of at least 8 dl/g and 60 parts by weight of a 0.25% aqueous solution of an acrylamide homopolymer of molecular weight 80,100.

In a comparative test the 0.25% aqueous solution of the same cationic copolymer of acrylamide with dimethylaminoethyl acrylate, methyl chloride quaternary ammonium (40/60 weight/weight), intrinsic viscosity of at least 8 dl/g was tested alone.

The percentage increase in cake solids was measured.

The results from table 2 show that the mixture of cationic and low molecular weight polymers according to the present invention showed improved cake solids more than could even be achieved by the use of cationic polymer alone.

TABLE 2

| Relative Dose | Cationic alone | Cationic/Nonionic according to the invention |
|---|---|---|
| 3 | 1.9 | |
| 3.5 | 2.0 | |
| 4 | 2.0 | 2.6 |
| 5 | | 4.4 |
| 6 | | 3.5 |

Figure 2:
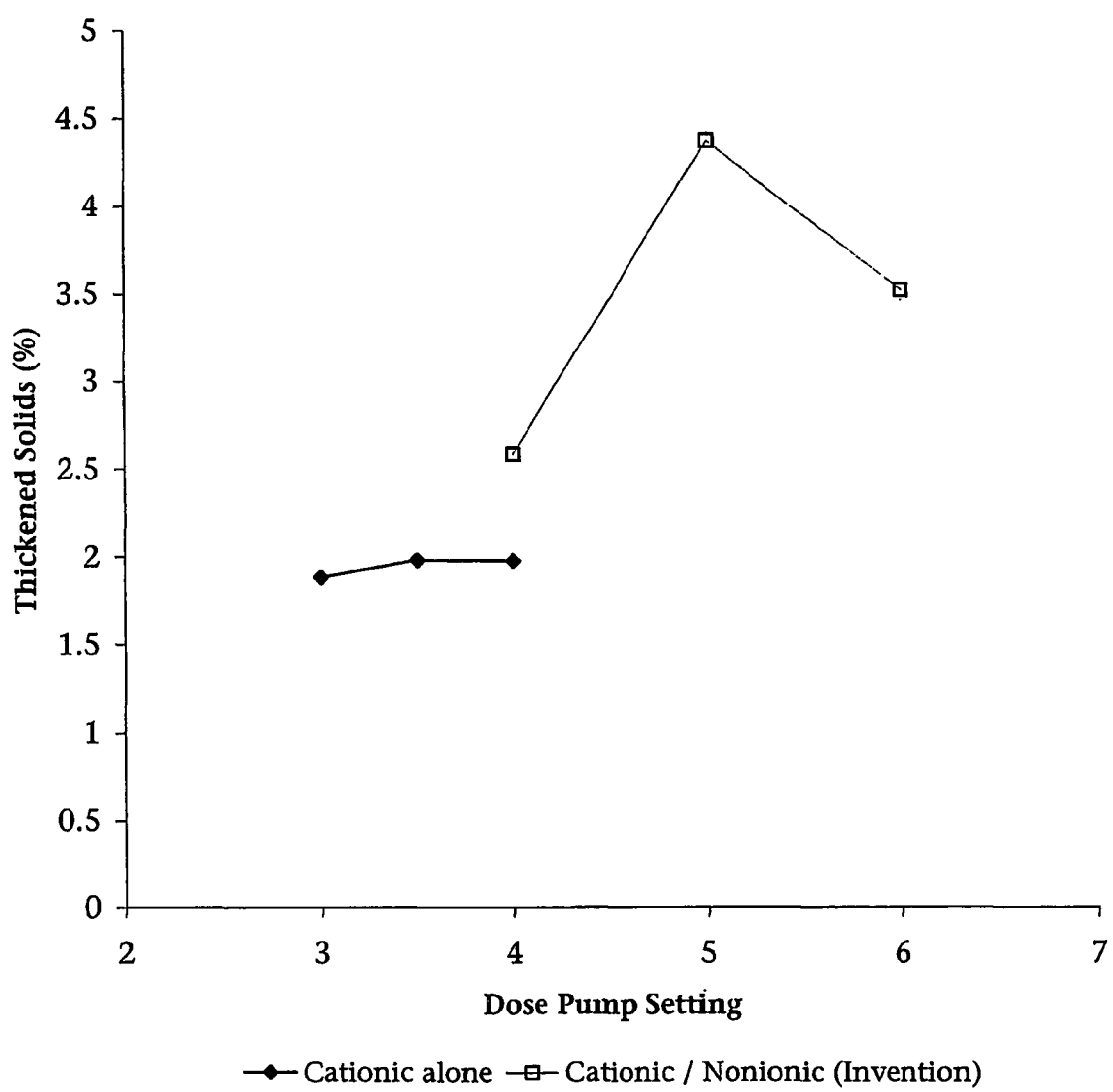

The results are plotted and shown in FIG. 2. In addition FIGS. 3 and 4 show photographs of the thickened sludge by the treatment of cationic polymer alone and by the treatment of the invention respectively.

EXAMPLE 3

Example 1 was repeated but using the treatments using either single cationic polymer treatment or aqueous compositions containing 50/50 weight/weight cationic and non-ionic polymer. The volume of water drained in 5 seconds using 250 ml Rotherham sewage sludge DP/A employing 15 seconds shearing at 2000 rpm, using a treatment solution of 0.25% polymer concentration syringed into the sludge and using an 8 cm sieve.

The following polymers were used:

Polymer A Copolymer of 60% by weight methyl chloride quaternised dimethylaminoethyl acrylate and 40% by weight acrylamide of intrinsic viscosity 12 dl/g.

CATIONIC

Polymer B Copolymer of 60% by weight methyl chloride quaternised dimethylaminoethyl acrylate and 40% by weight acrylamide of intrinsic viscosity 8 dl/g.

CATIONIC

Polymer W Acrylamide homopolymer of molecular weight about 80,000
NONIONIC

Polymer X Acrylamide homopolymer of intrinsic viscosity of 13 dl/g.
NONIONIC

Polymer Y Nonionic Starch
NONIONIC

Polymer Z Cationic starch (less than 10 mole % cationic)
NONIONIC

The drainage results are shown in Table 3 and FIG. 5.

TABLE 3

| Dose mg/l | A | B | A + W | A + Y | A + Z | A + X |
|---|---|---|---|---|---|---|
| 140 | 50 | | | | | |
| 160 | 98 | 60 | | | | |
| 180 | 130 | 116 | 30 | 50 | 40 | 50 |
| 200 | 140 | 130 | 66 | 110 | 96 | 110 |
| 220 | 146 | 146 | 100 | 144 | 146 | 150 |
| 240 | 136 | 146 | 138 | 160 | 162 | 168 |
| 260 | | 144 | 168 | 170 | 170 | 170 |
| 280 | | 140 | 170 | 170 | 166 | 166 |
| 300 | | | 166 | 166 | | |

The results show that drainage is improved using the blends of cationic polymer and nonionic polymer.

EXAMPLE 4

Example 3 was repeated but using the following treatments. In addition to the polymers used in example 3, the following polymers were also used The following polymers were used:

Polymer P Copolymer of 10% by weight sodium acrylate and 90% by weight acrylamide of intrinsic viscosity 18 dl/g.
NONIONIC Polymer Q Copolymer of 2% by weight sodium acrylate and 98% by weight acrylamide of intrinsic viscosity 15 dl/g.
NONIONIC Polymer R Copolymer of 15% by weight methyl chloride quaternised dimethylaminoethyl acrylate and 85% by weight acrylamide of intrinsic viscosity 15 dl/g.
NONIONIC Polymer S Copolymer of 40% by weight methyl chloride quaternised dimethylaminoethyl acrylate and 60% by weight acrylamide of intrinsic viscosity 8 dl/g.

COMPARATIVE

Polymer T Copolymer of 60% by weight methyl chloride quaternised dimethylaminoethyl acrylate and 40% by weight acrylamide of intrinsic viscosity 8.9 dl/g.

COMPARATIVE

Polymer V Copolymer of 80% by weight methyl chloride quaternised dimethylaminoethyl acrylate and 20% by weight acrylamide of intrinsic viscosity 8.1 dl/g.

COMPARATIVE

The drainage results are shown in Table 4 and FIG. 6.

TABLE 4

| Dose mg/l | A | B | A + W | A + X | A + P | A + Q | A + R | A + S | A + T | A + V |
|---|---|---|---|---|---|---|---|---|---|---|
| 140 | 50 | | | | | | | | 50 | 60 |
| 160 | 98 | 60 | | | | 40 | 70 | 50 | 106 | 116 |
| 180 | 130 | 116 | 30 | 50 | 40 | 98 | 130 | 118 | 136 | 138 |
| 200 | 140 | 130 | 66 | 110 | 96 | 130 | 160 | 146 | 148 | 140 |
| 220 | 146 | 146 | 100 | 150 | 150 | 156 | 170 | 150 | 140 | 136 |
| 240 | 136 | 146 | 138 | 168 | 168 | 168 | 170 | 156 | | |
| 260 | | 144 | 168 | 170 | 166 | 170 | 160 | 148 | | |
| 280 | | 140 | 170 | 166 | 160 | 166 | | | | |
| 300 | | | 166 | | | | | | | |

The results show the benefits of using blends of cationic and non-ionic polymer, when non-ionic polymer contains no more than 10 mole % ionic units.

EXAMPLE 5

Example 3 was repeated except using 500 mls Copley, A Sewage Sludge and using various polymer treatments. The results are shown in Table 5 and FIG. 7.

TABLE 5

| Dose Mg/l | A | B | A + W | A + Y | A + Z | A + X |
|---|---|---|---|---|---|---|
| 20 | 70 | | | | | |
| 30 | 140 | | | 60 | | 70 |
| 40 | 180 | 80 | | 110 | 60 | 120 |
| 50 | 190 | 160 | 80 | 185 | 160 | 180 |
| 60 | 175 | 180 | 140 | 225 | 200 | 235 |
| 70 | | 200 | 200 | 245 | 240 | 260 |
| 80 | 140 | 200 | 245 | 270 | 235 | 240 |
| 90 | | 180 | 270 | 240 | 210 | |
| 100 | | | 255 | | | |

EXAMPLE 6

Example 3 was repeated using single cationic treatments aqueous blended non-ionic/cationic and sequential cationic and high molecular weight non-ionic. The results are shown in Table 6 and FIG. 8.

TABLE 6

| Dose mg/l | A | A + X blend | A + X blended | A + X separate but simultaneous | A first then X | X first then A | A + W blend |
|---|---|---|---|---|---|---|---|
| 140 | 70 | | | | | | |
| 160 | 118 | 60 | 60 | 40 | 60 | 50 | |
| 180 | 134 | 100 | 108 | 88 | 92 | 108 | 50 |
| 200 | 138 | 142 | 144 | 130 | 114 | 128 | 116 |
| 220 | 118 | 168 | 156 | 136 | 128 | 140 | 148 |
| 240 | | 160 | 168 | 138 | 120 | 122 | 162 |
| 260 | | 154 | 154 | 140 | 110 | | 160 |
| 280 | | | | 132 | | | 150 |

The results show the benefits of using blends of non-ionic polymer and cationic polymer over separate addition when a high molecular weight non-ionic polymer is used.

The invention claimed is:

1. An aqueous composition comprising,
   a) a substantially non-ionic water-soluble polymer and
   b) a cationic polymeric flocculant of intrinsic viscosity at least 4 dl/g,
   wherein the substantially non-ionic water-soluble polymer is formed from acrylamide or is a starch and having an average molecular weight between 20,000 and 20,000,000 and
   the cationic polymeric flocculant includes homopolymers or acrylamide copolymers of dimethylaminoethyl (meth)acrylate and dimethylaminoethyl (meth) acrylamide quaternary ammonium or acid salts, wherein the weight ratio of cationic flocculant to non-ionic polymer ranges from 10:90 to 90:10.

2. A composition according to claim 1 in which the non-ionic polymer has an average molecular weight between 20,000 and 750,000.

3. A composition according to claim 1 in which the substantially non-ionic polymer has a molecular weight of between 20,000 and 500,000.

4. A composition according to claim 1 in which the substantially non-ionic polymer exhibits an intrinsic viscosity of at least 4 dl/g.

5. A composition according to claim 1 in which the substantially non-ionic polymer is formed form water soluble ethylenically unsaturated monomers comprising at least one nonionic monomer and optionally up to 10 mole % ionic monomers.

6. A composition according to claim 1 in which the substantially non-ionic polymer is a homopolymer of acrylamide.

7. A composition according to claim 1 in which the composition comprises particles of average particle size of up to 10 microns.

8. A composition according to claim 1 in which the composition consists essentially of water, the substantially non-ionic polymer component (a) and the cationic polymer component (b).

9. A composition according to claim 1 in which the total concentration of both components (a) and (b) is at least 0.05% by weight of total weight of composition.

10. A method of preparing a composition defined according to claim 1, comprising mixing together an aqueous solution of the substantially non-ionic polymer and an aqueous solution of the cationic polymer.

11. A method of preparing a composition defined according to claim 1, comprising admixing with water substantially anhydrous particles of non-ionic polymer of component (a) and substantially anhydrous particles of cationic polymer of component (b), wherein component (a) and component (b) are defined in accordance with claim 1.

12. A method according to claim 11 wherein the particles of non-ionic polymer and particles of cationic polymer are blended together before admixing with water.

13. A composition comprising a blend of substantially anhydrous particles of non-ionic polymer of component (a) and substantially anhydrous particles of cationic polymer of component (b), wherein component (a) and component (b) are defined in accordance with claim 1.

14. An aqueous composition comprising,
   a) a substantially non-ionic water-soluble polymer solution, comprising no more than 10 mole % ionic repeating units and
   b) a cationic polymeric flocculant solution of intrinsic viscosity at least 4 dl/g,
   wherein the substantially non-ionic water-soluble polymer is formed from acrylamide or is a starch having an average molecular weight between 20,000 and 20,000,000 and
   the cationic polymeric flocculant includes homopolymers or acrylamide copolymers of dimethylaminoethyl (meth)acrylate and dimethylaminoethyl (meth) acrylamide quaternary ammonium or acid salts, wherein the weight ratio of cationic flocculant to non-ionic polymer ranges from 10:90 to 90:10.

* * * * *